United States Patent
Berghuijs (10) Patent No.: US 9,739,405 B2
(45) Date of Patent: Aug. 22, 2017

(54) SAFETY COUPLING FOR VEHICLE EXHAUST EXTRACTION SYSTEM

(75) Inventor: Stefan Berghuijs, Alkmaar (NL)

(73) Assignee: Plymovent Exhaust Extraction B.V., Alkmaar (NL)

( * ) Notice: Subject to any disclaimer, the term of this patent is extended or adjusted under 35 U.S.C. 154(b) by 667 days.

(21) Appl. No.: 13/634,139

(22) PCT Filed: Mar. 10, 2011

(86) PCT No.: PCT/EP2011/053644
§ 371 (c)(1),
(2), (4) Date: Nov. 21, 2012

(87) PCT Pub. No.: WO2011/110641
PCT Pub. Date: Sep. 15, 2011

(65) Prior Publication Data
US 2013/0099484 A1 Apr. 25, 2013

(30) Foreign Application Priority Data
Mar. 12, 2010 (EP) .................................. 10156448

(51) Int. Cl.
*F16L 37/096* (2006.01)
*F16L 37/127* (2006.01)

(52) U.S. Cl.
CPC .......... *F16L 37/096* (2013.01); *F16L 37/127* (2013.01)

(58) Field of Classification Search
CPC ..... F16L 37/127; F16L 37/096; F16L 37/086; F16L 37/20; F16L 37/12; F16L 23/06

USPC .. 285/317, 318, 82, 1, 308, 307, 83, 87, 88, 285/311, 312
See application file for complete search history.

(56) References Cited

U.S. PATENT DOCUMENTS

| 2,528,369 | A |   | 10/1950 | Jensen |
|-----------|---|---|---------|--------|
| 4,138,149 | A | * | 2/1979  | Bormioli ............... F16L 37/107 285/320 |
| 4,373,377 | A | * | 2/1983  | Smith et al. ................. 73/23.31 |
| 6,053,540 | A | * | 4/2000  | Meyer ..................... F16L 37/18 285/312 |

(Continued)

FOREIGN PATENT DOCUMENTS

DE  19622860 A1  1/1997
EP  0217531 A2  4/1987

(Continued)

OTHER PUBLICATIONS

"European Application Serial No. 10156448.2, European Search Report mailed Dec. 14, 2010", 7 pgs.

(Continued)

*Primary Examiner* — Gregory Binda
*Assistant Examiner* — Zachary Dragicevich
(74) *Attorney, Agent, or Firm* — Schwegman Lundberg & Woessner, P.A.

(57) ABSTRACT

A safety coupling assembly can be used to connect segments of a conduit, such as a hose or a flexible pipe. The safety coupling assembly comprises a female member and a male member, which are held together by spring operated toggle latches. The force required for connecting the female member with the male member of the safety coupling assembly can be selected independent from the force required for disconnecting the male member form the female member.

19 Claims, 9 Drawing Sheets

(56) References Cited

U.S. PATENT DOCUMENTS

| | | | |
|---|---|---|---|
| 6,447,016 B2* | 9/2002 | Collier | F16L 37/18 |
| | | | 285/312 |
| 2004/0075273 A1 | 4/2004 | Sjoberg | |
| 2010/0308480 A1* | 12/2010 | Suzuki | 261/74 |

FOREIGN PATENT DOCUMENTS

| | | |
|---|---|---|
| GB | 855557 A | 12/1960 |
| WO | WO-2008/088272 A1 | 7/2008 |

OTHER PUBLICATIONS

"International Application Serial No. PCT/EP2011/053644, International Search Report mailed Nov. 30, 2011", 6 pgs.

"International Application Serial No. PCT/EP2011/053644, Written Opinion mailed Nov. 30, 2011", 9 pgs.

* cited by examiner

SAFETY COUPLING FOR VEHICLE EXHAUST EXTRACTION SYSTEM

RELATED APPLICATIONS

This application is a U.S. National Stage Filing under 35 U.S.C. 371 from International Application No. PCT/EP2011/053644, filed on Mar. 10, 2011, and published as WO 2011/110641 A2 on Sep. 15, 2011, which claims priority to European Patent Application No. 10156448.2 on Mar. 12, 2010; which applications and publication are incorporated herein by reference in their entirety.

BACKGROUND OF THE INVENTION

1. Field of the Invention

The invention relates generally to a safety coupling for a conduit, such as a hose of a vehicle extraction system, and more particularly to a safety coupling providing reliable operation and easy reconnect.

2. Description of the Related Art

Many industries use conduits for the transportation of liquids, gases, electric power, signals, data, and the like, over shorter or longer distances. The conduit may be a pipe, a hose, a cable, or any other conduit suitable for transporting the commodity of interest.

Such conduits are generally designed to withstand adverse conditions as may be encountered in the environment in which the conduit is located. However, conduits may occasionally encounter forces that are greater than the design specifications of the conduit allow for. Such unusual forces may be the result of, for example, an equipment failure, extreme weather conditions, or human error.

For these reasons, it must be anticipated that any conduit may encounter conditions that are so severe that the conduit will fail, for example rupture or break. It is desirable to provide a conduit with one or more safety couplings. The purpose of a safety coupling generally is to disconnect two ends of the conduit in case of an unusually strong force being exerted on the conduit. The operation of the safety coupling ensures that the conduit ends are disconnected before damage of the conduit occurs. An additional advantage of the use of a safety coupling is that disruption of the conduit takes place at a predictable location, making it easier to locate the interruption in the line. Safety couplings can be provided in places that are readily accessible, making repairs less cumbersome than they otherwise might be. For conduits that transport dangerous commodities, such as combustible or explosive materials, or high voltage electric power, the safety coupling can be combined with a shut off valve or a switch to prevent danger to the environment and personnel in the vicinity of the rupture.

These principles will be further illustrated with reference to vehicle exhaust extraction systems. Vehicle exhaust extraction systems are designed to permit indoor operation of internal combustion engines. These systems generally comprise a nozzle, which is designed to connect to the tailpipe of a vehicle; a flexible hose connecting the nozzle to an exhaust mechanism comprising a blower fan. The exhaust mechanism is in fluid communication with the outside air, so that the blower fan expels exhaust fumes to the outside via the flexible hose.

Many vehicle exhaust extraction systems are used with emergency vehicles, such as Emergency Medical Services (EMS) vehicles and fire trucks. It is desirable that the vehicle exhaust extraction system automatically disconnects from the tailpipe of the vehicle as the vehicle leaves the building in which it was parked. Since these vehicles need to respond to emergency calls, it is undesirable to use a system that requires manual intervention.

Nozzle systems have been developed that are designed to automatically disconnect from the tailpipe as the vehicle passes a predetermined point, or when the vehicle exerts a pulling force on the flexible hose exceeding a predetermined threshold value.

One type of system uses an inflatable cuff that fits around the exhaust pipe of the vehicle, or around an adapter fitted to the exhaust pipe of the vehicle. The cuff is connected to a control mechanism in such a way that the cuff deflates when the vehicle passes a predetermined point, for example when the rear of the vehicle passes the door opening of the building.

Another type of system uses electromagnets for attaching the nozzle to the tailpipe, or to an adapter fitted to the tailpipe. A control mechanism switches off the power to the electromagnets as the vehicle passes a predetermined point, cause release of the nozzle from the vehicle.

Yet another approach relies on permanent magnets for attaching the nozzle to the vehicle. The magnetic force is such that the nozzle remains securely connected to the vehicle during normal operation inside the building. The magnetic force is, however, small enough for the nozzle to disconnect from the vehicle as soon as the vehicle exerts an appreciable pulling force on the hose of the exhaust extraction system.

Although the automatic nozzles available in the market in general operate reliably, occasionally the nozzle does not disconnect as intended, or the nozzle or another part of the exhaust extraction system gets caught behind a protrusion of the moving vehicle. Such mishaps can cause serious damage to the vehicle, to the exhaust extraction system, or both. To prevent such damage, exhaust extraction systems generally comprise a safety coupling designed to disconnect in case the nozzle release mechanism fails, or when the exhaust extraction system remains attached to the vehicle for some other reason.

DE 196 22 860 discloses a safety coupling comprising two external hose coupling parts for coupling together two hose ends. Inside the hose coupling parts are mounted mating portions of a wire coupling, connected to the nozzle and to the hose trolley, respectively. If the nozzle fails to disengage a pulling force is exerted on the wire. If the pulling force exceeds a predetermined threshold value the wire coupling disengages. As this safety coupling relies on a mechanical trigger for disengagement, it is itself subject to occasional malfunction. Moreover, the mechanism is relatively complicated, requiring fine-tuning in order for it to operate properly.

US Patent Application Publication 2004/0075273 discloses a safety coupling designed as a tubular, two-part flange, one flange having a straight edge, the other flange having a conical edge. The two flanges are held together by a resilient locking ring, which is comprised of a number of segments. The segments are held together by spring-loaded bolts. The coupling disconnects when a pulling force is exerted on the flanges large enough to overcome the spring bias of the ring, so that the ring segments are pushed apart.

WO 2008/088272 discloses a coupling system comprising a coupling member and an actuating member. The coupling member is operated pneumatically. Disconnection is triggered by the actuating member. The mechanism is mounted inside the duct for exhaust gas extraction, which exposes the mechanism to the corrosive components of exhaust gases.

As the system relies on a mechanical trigger mechanism, it is subject to potential malfunction.

Thus, there is a particular need for a safety coupling that does not comprise a separate actuation mechanism.

There is a further need for a safety coupling having a factory set release force, and does not require adjustment by the end user.

There is a further need for a safety coupling that can be re-connected easily.

BRIEF SUMMARY OF THE INVENTION

The present invention addresses these problems by providing safety coupling assembly comprising:
I) a first coupling member comprising a first flange comprising at least one recess on its outer surface;
II) a second coupling member designed to mate with the first coupling member, said second coupling member comprising a first flange and at least one spring loaded movable latch designed to engage the at least one recess on the outer surface of the first coupling member.

Another aspect of the invention comprises a vehicle exhaust extraction system comprising the safety coupling assembly.

BRIEF DESCRIPTION OF THE DRAWINGS

The features and advantages of the invention will be appreciated upon reference to the following drawings, in which.

GENERAL DESCRIPTION OF THE INVENTION

The invention relates to a safety coupling that can be used for any type of conduit. Examples of conduits for which the safety coupling can be used include pipes, hoses, cables, and the like.

An important aspect of the safety coupling of the invention is that the force required for disconnection of the coupling can be selected independent from the selected force required for connection or re-connection. This feature makes the safety coupling particularly suitable for applications in which the force required for disconnection is selected to be high, for example more than 400 Newtons. The force required for re-connection can, if desired, be set at a significantly lower value, for example 40 Newtons or less, so that reconnection can be accomplished manually, even by one person.

The safety coupling is particularly useful in applications where the threshold force for disconnection must be high, making it desirable to enable connection requiring a considerably lesser force.

The invention will be described in detail with reference to vehicle exhaust extraction systems. It will be understood that the invention can be used for conduits of any kind, and in particular to conduits that may be exposed to unplanned mechanical impact, for example as a result of human error or extreme environmental conditions. For example, overhead power lines can be covered with a heavy layer of ice during an ice storm, causing gravity force to exceed the mechanical strength of the line. Overhead power lines can be impacted by imprudent contact with construction equipment. Ocean floor cables can be subject to mechanical impact resulting from human error during dredging operations. Oil pipes connecting a tanker to a terminal can come under stress when the tanker moves while still connected to the terminal, etc.

DESCRIPTION OF ILLUSTRATIVE EMBODIMENTS

The following is a description of certain embodiments of the invention, given by way of example only and with reference to the drawings. The exemplified safety coupling can be used for flexible hoses. The depicted safety coupling may also be used for other types of conduits.

Figure 1:
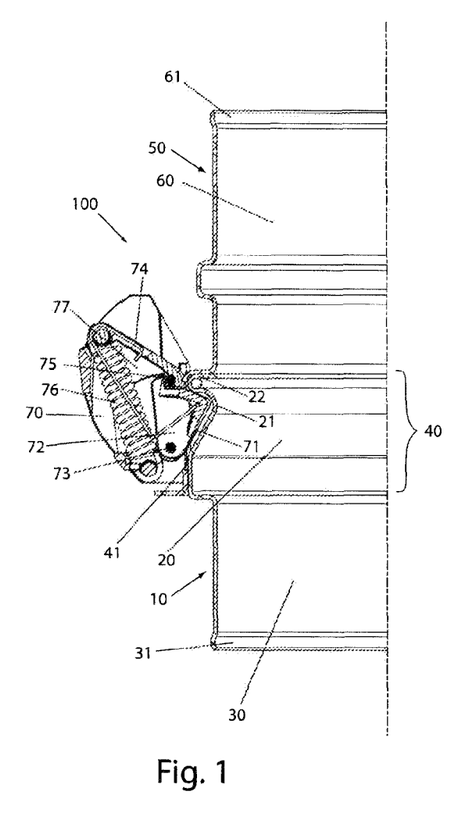
FIG. 1 is a cross sectional view of one embodiment of the invention showing the safety coupling assembly in its connected configuration.

Referring to FIG. 1, a safety coupling assembly 100 is shown in its connected configuration.

Male coupling member 10 comprises a first flange 20 and a second flange 30. Second flange 30 is designed for attachment of a tubular duct, for example a flexible hose. Second flange 30 has a rim 31, which extends outwardly from flange 30. Rim 31 prevents a tubular duct (not shown), which may be attached to second flange with a hose clamp (not shown) from sliding off.

First flange 20 of male coupling member 10 has an annular groove 21, ending in rim 22.

Female coupling member 50 has a first flange 40 and a second flange 60. Second flange 60 is designed for attachment of a tubular duct, for example a flexible hose. Second flange 60 has a rim 61, which extends outwardly from flange 60. Rim 61 prevents a tubular duct (not shown), which may be attached to second flange with a hose clamp (not shown) from sliding off.

Mounted on the outside of female coupling member 50 are two spring loaded toggle latches 70. Latches 70 protrude inwardly through openings 41 in first flange 40. The protruding portions 71 of latches 70 are shaped and dimensioned to fit in groove 21 of male coupling member 10.

Secondary latches 72 are pivotable around pivot axes 73. Secondary latches 72 are biased inwardly by wire springs 747.

Primary latches 77 are pivotable around pivot axes 75. Primary latches 77 are biased inwardly by pre-tensioned coil springs 76.

Figure 2:
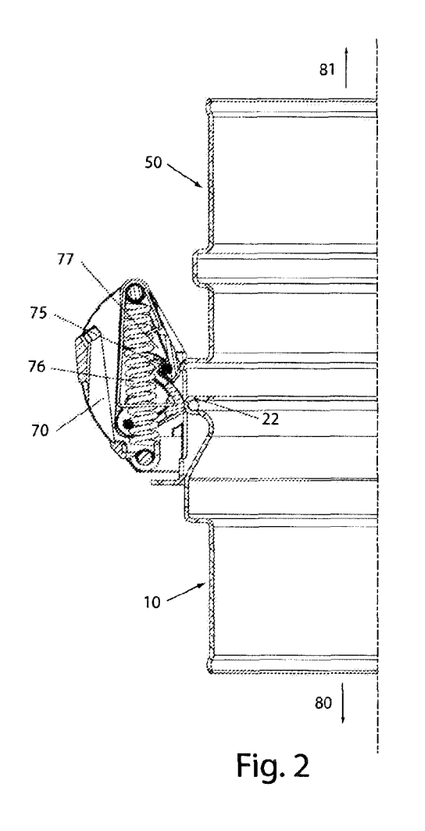
FIG. 2 is a cross sectional view of the safety coupling assembly of FIG. 1, at the cusp of becoming disconnected.

FIG. 2 depicts the safety coupling assembly at a point in time when male coupling member 10 is just about to become disconnected from female coupling member 50. The two coupling members are being moved apart, as indicated by arrows 80 and 81. The force applied in moving the two coupling members apart has forced primary latches 77 to pivot around pivot axes 75, against the force of cod springs 76. As the latches have moved to rim 22 of male coupling member 10, no further force is required to separate coupling members 10 and 50.

Figure 3:
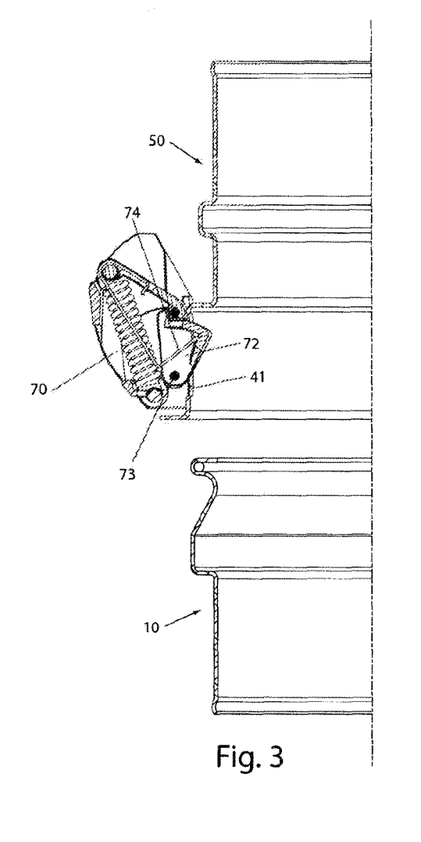
FIG. 3 is a cross sectional view of the safety coupling assembly of FIG. 1, in its disconnected configuration.

FIG. 3 shows the safety coupling assembly in its fully disconnected configuration. Secondary latches 72 are pushed inwardly through openings 41. In order to reconnect male coupling member 10 and female coupling member 50 it will be necessary to pivot secondary latches 72 outwardly around pivot axes 73, so that latches 70 may pass rim 22. For this pivoting action the spring force of spring 7471A, 7113 needs to be overcome.

Figure 4:
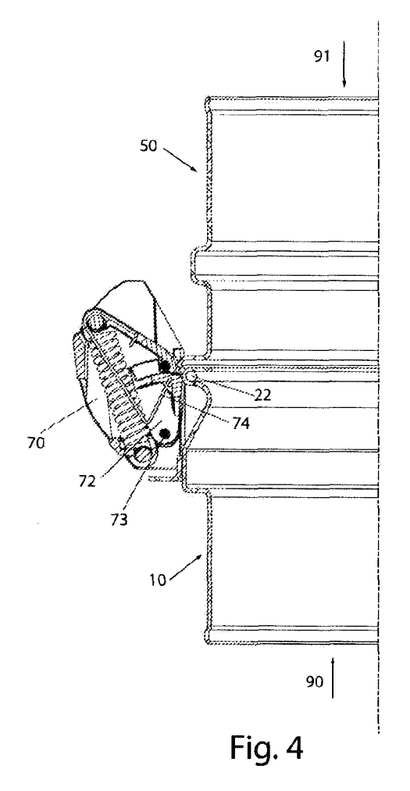
FIG. 4. is a cross sectional view of the safety coupling assembly of FIG. 1, at the cusp of becoming re-connected.

FIG. 4 shows the safety coupling assembly in the process of being re-connected. Male coupling member 10 is being slid into female coupling member 50, as being shown by arrows 90 and 91. Secondary latches 72 have been pivoted outwardly against the force of wire springs 74, far enough to permit latches 70 to slide past rim 22.

Figure 5A:
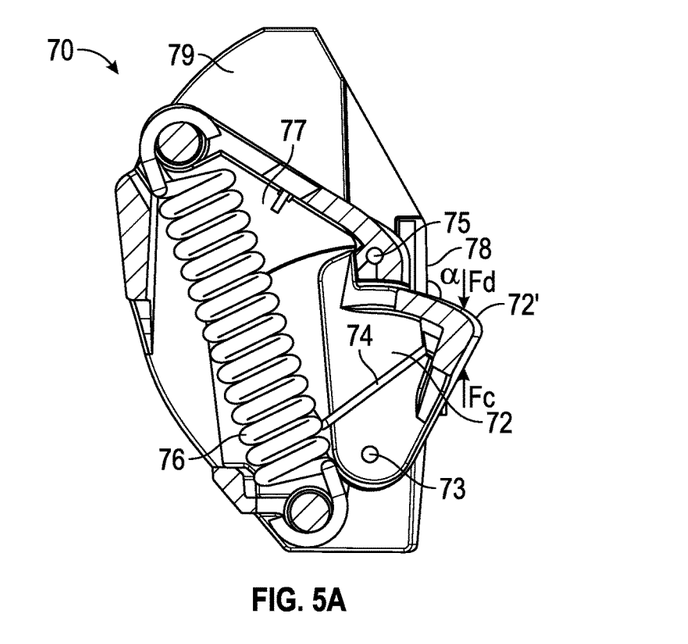
FIGS. 5A, 5B and 5C are cross sectional views of one spring loaded latch of the embodiment of FIG. 1.
Figure 5B:
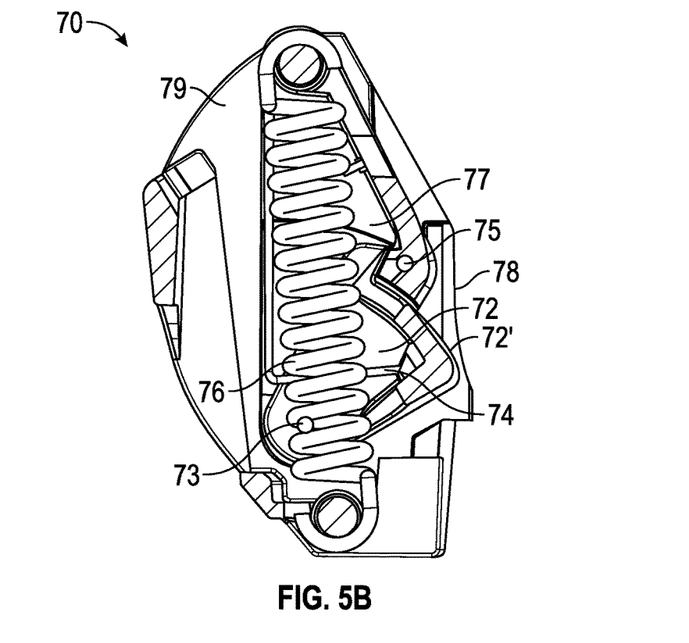
Figure 5C:
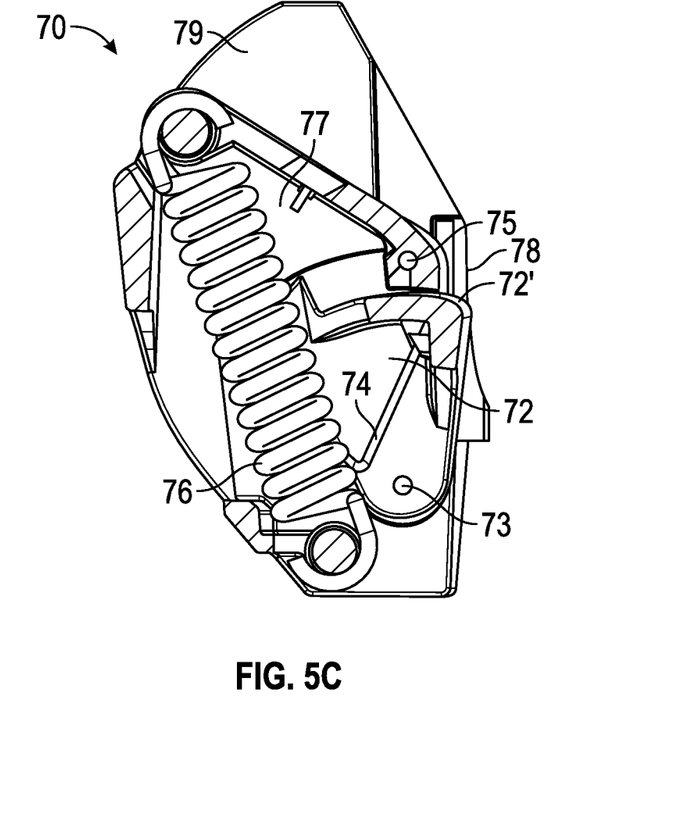

FIGS. 5A, 5B and 5C show cross-sectional views of toggle latch 70. FIG. 5A shows toggle latch 70 in the rest position. Toggle latch 70 comprises a stationary housing 79, a primary latch 77, and a secondary latch 72. Primary latch 77 can be rotated clockwise around axis 75, against the force of coil spring 76. Axis 75 is mounted in stationary housing 79. Secondary latch 72 can be rotated counter-clockwise around axis 73, against the force of wire spring 74. Axis 73 is mounted on primary latch 77.

When the male coupling member is slid into the female coupling member, the edge of rim 22 of the male coupling member (see FIG. 1) exerts a force $F_C$ onto secondary latch 72 (as indicated by the upward arrow in FIG. 5A). Force $F_C$ causes secondary latch 72 to rotate counterclockwise around axis 73, against the bias of wire spring 74. The force required for connecting the coupling members is determined by the force exerted by wire spring 74, multiplied by the number of toggle latches present in the safety coupling.

FIG. 5C shows toggle latch 70 with secondary latch 72 rotated counterclockwise so it no longer extends substantially beyond edge 78 of stationary housing 79. With secondary latch 72 in this position, the male coupling member 10 can slide into female coupling member 50 (see FIG. 4).

Referring again to FIG. 5A, when the male coupling member 10 and the female coupling member 50 are being pulled apart, rim 22 of male coupling member exerts a disconnecting force $F_D$ onto secondary latch 72, as indicated by the downward arrow in FIG. 5A. The angle α formed by edge 78 of stationary housing 79 and edge 72' of secondary is at least 90°. In the depicted embodiment edge 72' describes an arc having axis 73 as its center. The configuration of secondary latch 72, and in particular edge 72', is such that force $F_D$ is incapable of causing secondary latch 72 to rotate counterclockwise around axis 73.

Since secondary latch 72 does not rotate as a result of disconnecting force $F_D$, secondary latch 72 prevents the male and female coupling members from becoming disconnected.

Under unusual circumstances, however, disconnecting force $F_D$ may become so great as to overcome the force of coil spring 76. In this case force $F_D$ causes primary latch 77 to rotate clockwise around axis 75, against the bias of coil spring 76. The result of this rotation is shown in FIG. 5B. Secondary latch 72 is still extended, but as a result of the rotation of primary latch 77, edge 72' of secondary latch 72 is inside edge 78 of stationary housing 79. Secondary latch 72 no longer prevents disconnection of the male coupling member and the female coupling member, and the two become disconnected.

A highly desirable feature of this embodiment is the fact that the forces required for disconnecting and connecting the safety coupling assembly are determined by two different springs. The force required for disconnecting is determined by a cod spring 76. The force required for re-connecting is determined by wire spring 74. This feature makes it possible to select a relatively low force for re-connecting the coupling members, while selecting a much higher force for disconnecting the coupling members. In other words, reconnection can be made to be easy, without compromising the threshold force required for a safety disconnect.

It will be understood that the male and female coupling members may be reversed, so that the pivoting latches are mounted on the inside of the male coupling member. This configuration is, for example, desirable for conduits that transport a non-corrosive gas or fluid. The latch mechanisms are protected from the environment, and are instead exposed to the non-corrosive gas or fluid inside the conduit.

The safety coupling of the invention is particularly suitable for coupling hose sections of a vehicle exhaust extraction system. Such systems generally comprise a nozzle for connecting a hose section to the exhaust pipe of a vehicle, for example a fire engine, or an EMS vehicle. For operation of the exhaust system it is generally necessary to move the nozzle into contact with the exhaust pipe. It is desirable to provide a handle facilitating the manipulation of the hose section comprising the nozzle.

Figure 6:
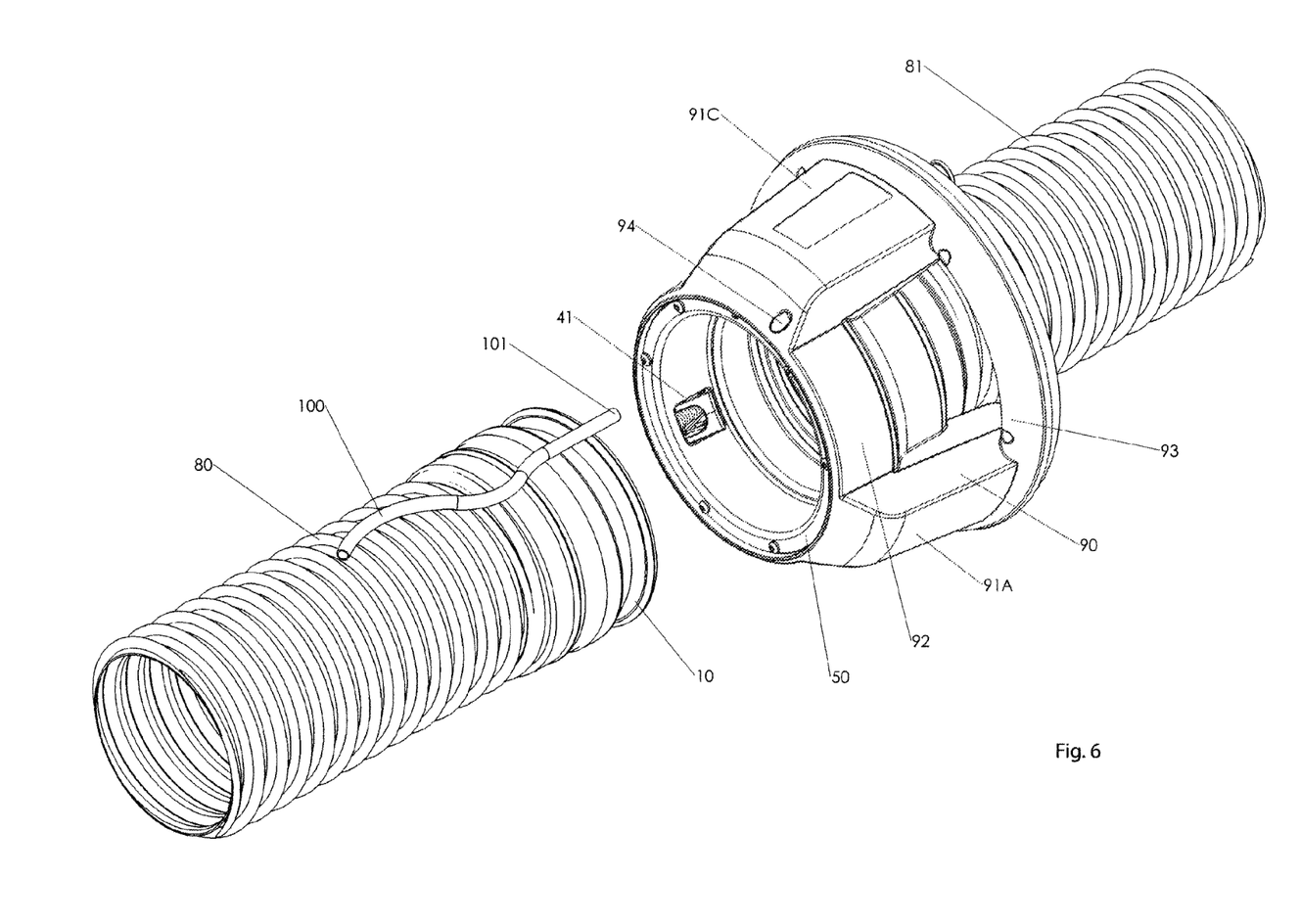
FIG. 6 is a perspective schematic view of a specific embodiment of the safety coupling of the invention.

FIG. 6 shows a perspective view of an embodiment of the invention having a handling wheel integrated with the safety coupling. Male coupling member 10 and female coupling member 50 are shown in disconnected configuration. Attached to male coupling member 10 is a hose section 80, which carries at its opposite end a nozzle (not shown) for connecting the hose section to a vehicle exhaust pipe (not shown). Attached to female coupling member 50 is a hose section 81, the opposite end of which is connected to a fan (not shown) for extracting exhaust gases. It will be understood that the male coupling member and the female coupling member may be reversed, i.e., the hose section connected to the male member can be connected to the fan, and the hose section connected to the female member can be connected to the nozzle.

Female coupling member 50 is provided with three openings 41, one of which is shown in FIG. 6. Openings 41, which are located at 120° from each other around the periphery of female coupling member 50, can accommodate the protruding secondary latch of a toggle latch mechanism (not shown).

Surrounding female coupling member 50, and extending outwardly from it, is handling wheel assembly 90. Handling wheel assembly 90 comprises a sleeve portion 92, which snugly encircles female coupling member 50. Handling wheel assembly 90 further comprises three spokes, 91A, 91B, and 91C, which connect handling wheel 93 to sleeve 92. In this particular embodiment each of spokes 91A, 91B and 91C provides a housing for a toggle latch mechanism (not shown).

Also shown in FIG. 6 is a tubular section 100. Tubular section 100 can be part of a pneumatic line or an electric line, designed for operating the nozzle. Although only a segment of the line is shown in FIG. 6, line 100 extends to the nozzle. When the two coupling members are connected, tubular end 101 is pushed into hole 94 of handling wheel assembly 90. Inside spoke 91C is a safety coupling mechanism for the pneumatic line (not shown). In the case of electrically operated nozzles (for example, nozzles relying on electromagnets for attachment to the vehicle exhaust pipe), tubular end 101 can comprise an electric plug, for example a tip-sleeve (TS) plug. Hole 94 can contain the corresponding jack.

In general hose section 81 is provided with a corresponding tubular segment, which is connected to a power source (i.e., an air compressor or a source of electric power) in the vicinity of the fan.

Certain nozzle systems do not require a power source to effect attachment of the nozzle to the vehicle exhaust pipe. Examples of such nozzles include nozzles comprising permanent magnets. When such a nozzle is used, the power line running alongside the hose can be omitted.

Figure 7:
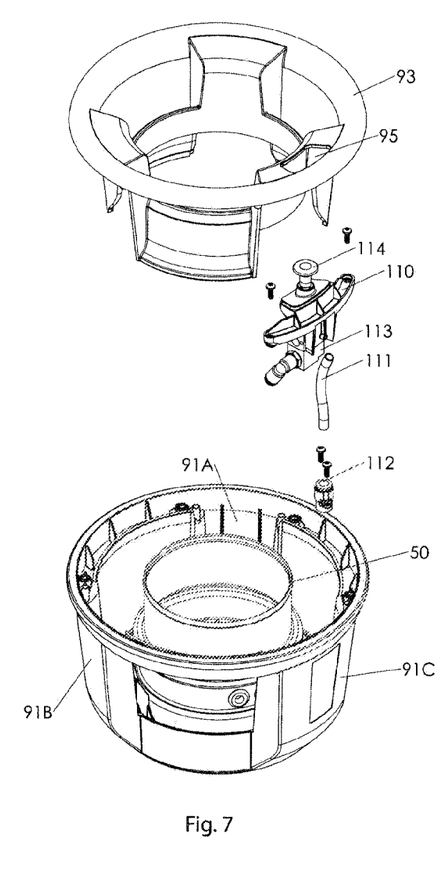
FIG. 7 is an exploded view of the safety coupling of FIG. 6.

FIG. 7 presents an exploded view of handling wheel assembly 90, including female coupling member 50. FIG. 7 shows a push button 114 for actuating the nozzle mechanism (not shown) by supplying compressed air to it. Button 114 is mounted on valve bracket 110, and actuates pneumatic valve 113. Upon assembly push button 114 protrudes through opening 95 in handling wheel 93. The operator uses handling wheel 93 to slide the nozzle over the tail pipe of the vehicle, then uses button 114 to operate the nozzle attachment mechanism. For electrically operated nozzle attachment systems handling wheel 93 can be provided with an electric switch, for example on valve bracket 110.

Button 114 is connected to push-in coupling 112 by tubular section 111. Upon assembly push-in coupling 112 is lined up with hole 94 to receive tubular end 101 (see FIG. 6).

Figure 8:
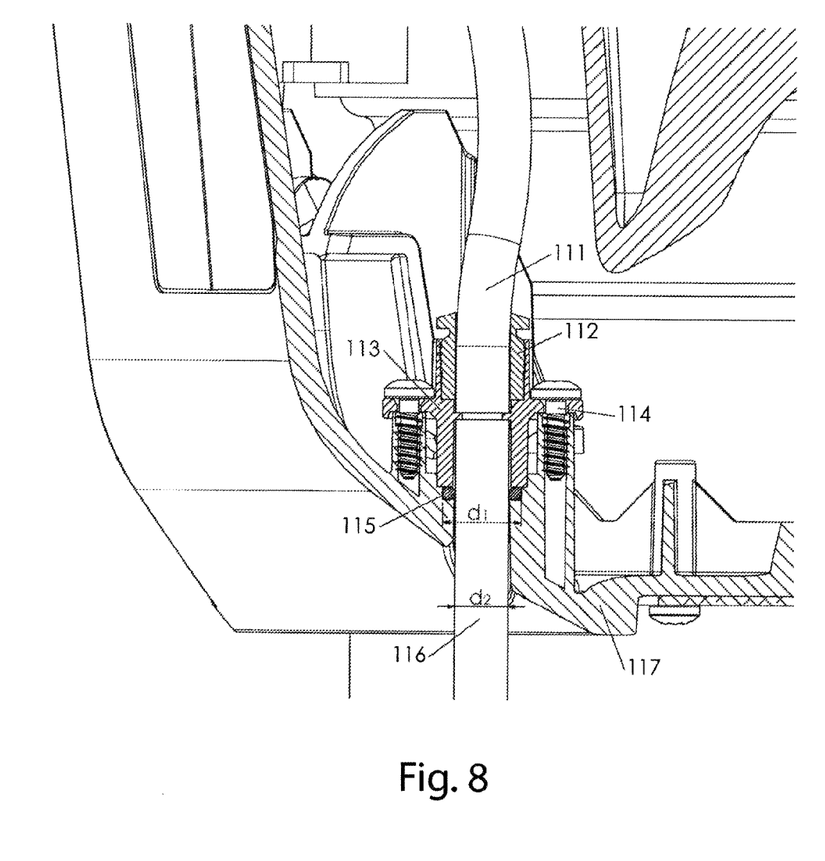
FIG. 8 is a cross section view of the pneumatic coupling portion of the embodiment of FIG. 7.

FIG. 8 presents a cross-sectional view of the push-in coupling for the pneumatic line. Tubular end 111 is securely attached to circular bracket 113 by means of fit-in coupling 112. Bracket 113 fits into a cylindrical bore provided in a suitable part 117 of the safety coupling, for example the handling wheel assembly, and can be attached thereto by means of screws 114. The cylindrical bore has an upper portion with a first diameter $d_1$ and a lower portion with a second diameter $d_2$, wherein $d_1 > d_2$. O-ring 115 rests at the bottom of the upper portion of the cylindrical bore. The inner diameter of O-ring 115 is approximately equal to $d_2$.

During assembly of the push-in coupling, O-ring 115 is placed in its intended location inside the upper portion of the cylindrical bore. Bracket 113 is placed in the upper portion of the cylindrical bore, above O-ring 115, and kept in place with screws 114. Screws 114 are not tightened at this point.

Next, tubular end 116 is pushed into the lower portion of the cylindrical bore, past O-ring 115, and into bracket 113. Preferably, tubular section 116 is pushed up until it touchingly engages tubular end 111. Once tubular end 116 is in place, screws 114 are tightened so that bracket 113 pushes down on O-ring 115. Tightening of screws 114 causes O-ring 115 to deform. As O-ring 115 more or less snugly fits into the upper portion of the cylindrical bore, deformation of O-ring 115 causes O-ring 115 to be pressed against tubular end 116. Friction forces between O-ring 115 and tubular end 116 are sufficient to keep tubular end 116 in place inside bracket 113.

Tubular end 111 is, directly or indirectly, attached to one member of the safety coupling assembly (i.e., to the female member in the described embodiment). Tubular end 116 is attached, directly or indirectly, to the other member. When the safety coupling assembly is caused to become disengaged, pulling forces are exerted on tubular ends 111 and 116. The pulling forces are sufficient to overcome the friction force between O-ring 115 and tubular end 116. The pulling forces cause tubular end 116 to be pulled out of bracket 113, thereby disconnecting the pneumatic line, without causing damage to any of its parts.

It will be understood that the safety coupling assembly of the invention may comprise one toggle latch, or a plurality of toggle latches. The preferred number of toggle latches depends in part on the geometry of the safety coupling assembly. For example, a safety coupling assembly having square or rectangular cross section preferably comprises two or four toggle latches. A safety coupling assembly having a circular cross section preferably comprises three toggle latches, spaced apart by 120°.

The force required for connecting the two members of the safety coupling assembly is determined by the force of wire spring 74, multiplied by the number of toggle latches in the assembly. The force required for disconnecting the two members of the safety coupling assembly is determined by the force of coil spring 76, multiplied by the number of toggle latches in the assembly.

In general, it is preferred that the force required for connecting the two members of the safety coupling assembly not exceed about 40 Newtons, so as to permit manual connection by one person. The wire springs in a safety coupling assembly having three toggle latches preferably have a force of less than 14 Newtons each, for example in the range of from about 5 Newtons to about 14 Newtons, preferably in the range of from about 10 Newtons to about 14 Newtons.

The force required for disconnecting the two members of the safety coupling assembly should be high enough to avoid unnecessary decouplings, and low enough to ensure decoupling before the decoupling forces cause damages to the conduits being connected by the assembly. In the case of a vehicle exhaust extraction system, the decoupling force is preferably in the range of from about 400 Newtons to about 600 Newtons. Accordingly, in an assembly comprising three toggle latches, coil springs 76 preferably each exert a spring force in the range of from about 130 Newtons to about 200 Newtons.

What is claimed is:

1. A safety coupling assembly for connecting segments of a conduit comprising:
    a first coupling member comprising a first flange for connecting to a first segment of the conduit, the first coupling member comprising at least one recess on an outer surface of the first coupling member; and
    a second coupling member designed to mate with the first coupling member, the second coupling member comprising:
        a first flange for connecting to a second segment of the conduit, and at least one spring loaded movable latch having a protruding portion designed to engage the at least one recess on the outer surface of the first coupling member, wherein the at least one spring loaded latch comprises:
            a primary latch pivotable about a first pivot axis in a first rotational direction against a load of a first spring between a connect position and a disconnect position, and
            a secondary latch comprising the protruding portion and mounted on the primary latch via a second pivot axis so as to be pivotable about the second pivot axis in a second rotational direction opposite to the first rotational direction against a load of a second spring, away from a rest position in which the secondary latch abuts against the primary latch.

2. The safety coupling assembly of claim 1 wherein the at least one recess comprises an annular groove on the outer surface of the first coupling member.

3. The safety coupling assembly of claim 1 wherein the at least one spring loaded movable latch is mounted on the outer surface of the second coupling member, and protrudes through an opening in the first flange of the second coupling member.

4. The safety coupling assembly of claim 1 wherein the first coupling member is a male coupling member, and the second coupling member is a female coupling member.

5. The safety coupling assembly of claim 1 wherein the first coupling member is a female coupling member, and the second coupling member is a male coupling member.

6. The safety coupling assembly of claim 1 comprising at least two spring loaded movable latches.

7. The safety coupling assembly of claim 6 comprising three spring loaded movable latches.

8. The safety coupling assembly of claim 7 wherein the three spring loaded movable latches are positioned along a periphery of the first flange of the first coupling member at 120° from each other.

9. The safety coupling assembly of claim 1 wherein coupling is established by sliding the first coupling member into the second coupling member, thereby pivoting the at least one spring loaded moveable latch outwardly against the force of the first spring, until the at least one spring loaded movable latch snaps inwardly into the at least one recess on the outer surface of the first flange of the first coupling member.

10. The safety coupling assembly of claim 1 wherein decoupling is established by pulling the first coupling member out of the second coupling member, thereby pivoting the at least one spring loaded moveable latch outwardly against the force of the first spring.

11. The safety coupling assembly of claim 1 wherein the second spring exerts a force in the range of from 5 N to 14 N.

12. The safety coupling assembly of claim 1 wherein the first spring exerts a force in the range of from 130 N to 200 N.

13. The safety coupling assembly of claim 1 wherein the first coupling member comprises a second flange for the attachment of a flexible hose.

14. The safety coupling assembly of claim 1 wherein the second coupling member comprises a second flange for the attachment of a flexible hose.

15. The safety coupling assembly of claim 1 further comprising a pneumatic line connected by a self-disconnecting connector.

16. The safety coupling assembly of claim 15 wherein the self-disconnecting connector connects segments of the pneumatic line using a friction force.

17. The safety coupling assembly of claim 16 wherein the friction force is exerted by an O-ring.

18. The safety coupling assembly of claim 17 wherein the friction force is determined by an amount of deformation of the O-ring.

19. A vehicle exhaust extraction system comprising:
a safety coupling assembly for connecting segments of a conduit, the safety coupling assembly including:
a first coupling member comprising a first flange for connecting to a first segment of the conduit, the first coupling member comprising at least one recess on an outer surface of the first coupling member; and
a second coupling member designed to mate with the first coupling member, the second coupling member comprising:
a first flange for connecting to a second segment of the conduit, and at least one spring loaded movable latch having a protruding portion designed to engage the at least one recess on the outer surface of the first coupling member, wherein the at least one spring loaded latch comprises:
a primary latch pivotable about a first pivot axis in a first rotational direction against a load of a first spring between a connect position and a disconnect position, and
a secondary latch comprising the protruding portion and mounted on the primary latch via a second pivot axis so as to be pivotable about the second pivot axis in a second rotational direction opposite to the first rotational direction against a load of a second spring, away from a rest position in which the secondary latch abuts against the primary latch.

* * * * *

UNITED STATES PATENT AND TRADEMARK OFFICE
CERTIFICATE OF CORRECTION

PATENT NO. : 9,739,405 B2  
APPLICATION NO. : 13/634139  
DATED : August 22, 2017  
INVENTOR(S) : Stefan Berghuijs Page 1 of 1

It is certified that error appears in the above-identified patent and that said Letters Patent is hereby corrected as shown below:

On the Title Page

In item (30), in "Foreign Application Priority Data", in Column 1, Line 1, delete "10156448" and insert --10156448.2-- therefor Signed and Sealed this
First Day of May, 2018

Andrei Iancu
*Director of the United States Patent and Trademark Office*